United States Patent
Tu

(10) Patent No.: US 9,248,065 B1
(45) Date of Patent: Feb. 2, 2016

(54) PATIENT TRANSPORT APPARATUS FOR TRANSPORT BETWEEN A PATIENT BED AND A BATHTUB

(71) Applicant: Cong Thanh Diep Tu, Ho Chi Minh (VN)

(72) Inventor: Cong Thanh Diep Tu, Ho Chi Minh (VN)

(73) Assignee: Ton Duc Thang University, Ho Chi Minh (VN)

(*) Notice: Subject to any disclaimer, the term of this patent is extended or adjusted under 35 U.S.C. 154(b) by 0 days.

(21) Appl. No.: 14/564,069

(22) Filed: Dec. 8, 2014

(51) Int. Cl.
*A61G 7/14* (2006.01)
*A61G 7/10* (2006.01)
*B62B 3/02* (2006.01)

(52) U.S. Cl.
CPC ............ *A61G 7/1034* (2013.01); *A61G 7/1001* (2013.01); *A61G 7/1003* (2013.01); *A61G 7/1015* (2013.01); *A61G 7/1019* (2013.01); *A61G 7/1046* (2013.01); *B62B 3/022* (2013.01); *A61G 2200/34* (2013.01); *B62B 2203/10* (2013.01); *B62B 2205/04* (2013.01); *B62B 2205/06* (2013.01)

(58) Field of Classification Search
CPC ............ B62B 2203/02; B62B 2203/10; B62B 2203/11; B62B 3/022; B62B 2205/003; B62B 2205/04; B62B 2205/06; B62B 2206/003; B62B 2206/06; A61G 7/10; A61G 7/1003; A61G 7/15; A61G 7/19; A61G 7/1034; A61G 7/1046; B66F 7/0666
USPC .............................. 5/81.1 R, 83.1, 85.1, 87.1
See application file for complete search history.

(56) References Cited

U.S. PATENT DOCUMENTS

| | | | | |
|---|---|---|---|---|
| 3,205,512 A * | 9/1965 | Camper | ............................ | 5/86.1 |
| 4,288,195 A * | 9/1981 | Brewer | .......................... | 414/608 |
| 5,388,289 A * | 2/1995 | Casperson | ...................... | 5/86.1 |
| 5,601,302 A * | 2/1997 | Beard et al. | ................ | 280/250.1 |
| 6,047,418 A * | 4/2000 | Seide et al. | ........................ | 5/83.1 |
| 6,431,319 B1 * | 8/2002 | Myers et al. | ................... | 187/243 |
| 6,793,232 B1 * | 9/2004 | Wing | .......................... | 280/304.1 |
| 8,104,115 B2 * | 1/2012 | Gramkow et al. | ................ | 5/83.1 |
| 8,567,763 B1 * | 10/2013 | Nolan | ............................ | 254/122 |
| 8,935,814 B1 * | 1/2015 | Tu | ................................. | 5/81.1 R |
| 2009/0250672 A1 * | 10/2009 | Lin | ................................ | 254/2 C |
| 2010/0229299 A1 * | 9/2010 | Lear | ................................. | 5/89.1 |
| 2011/0016628 A1 * | 1/2011 | Masterson, Jr. | ................... | 5/87.1 |
| 2012/0280464 A1 * | 11/2012 | Nelson et al. | .............. | 280/86.75 |
| 2014/0374680 A1 * | 12/2014 | Tsang | ............................ | 254/7 C |

* cited by examiner

*Primary Examiner* — Katy M Ebner
*Assistant Examiner* — Emma K Frick

(57) ABSTRACT

A patient transport apparatus for transport between a patient bed and a bathtub is disclosed that includes: a base with caster wheels, a double scissor truss, mounted on the base, retracted and extended vertically by the operation of a base crank handle, and a hoisting assembly positioned atop of a support frame member. The hoisting member further includes winch handles connected to a set of pulleys which are connected to cables and a fabric sling for supporting a patient. The hoisting assembly is configured to move along the support frame member by means of wheels installed on the bottom side of the frame member so that the fabric sling can reach out to the patient. A telescoping support pole, connected to the front of the support frame member, designed to freely rotated and to lean against either the bed or the bathtub in order to provide balance to the apparatus when transporting the patient from the bed to the bathtub and vice versa.

20 Claims, 8 Drawing Sheets

PATIENT TRANSPORT APPARATUS FOR TRANSPORT BETWEEN A PATIENT BED AND A BATHTUB

FIELD OF THE INVENTION

The present invention relates generally to the field of medical devices. More specifically, the present invention relates to a patient transport apparatus assisting medical personnel to transport a patient between a bed and a bathtub.

BACKGROUND ART

Lifting helpless bedridden patients with permanent or temporary loss of mobility from their beds to a bathtub for bathing is important because such patients need regular sanitary cares to avoid skin sores and infections, especially when they are lying for a long period of time on their backs. Unhygienic patients often exacerbate their conditions and threaten other patients and the environment of the hospital in general. This problem is especially true in hospitals of third world countries. Therefore, there is a need for regular moving and bathing of patients.

The act of lifting a patient out of the bed is strenuous especially when the patient is heavy. Usually, nurses use a draw sheet whereupon a patient rests to help in turning and lifting the patient onto a hospital cart. However, moving a patient using this method can be dangerous because the nurses can slip their grasps of the bed sheet and drop the patient especially when the patient is heavy. As such, injuries to the nurses may occur. Furthermore, hospital carts are cumbersome and require a lot of space to store them.

The above described problems are especially true when patients are cared for at home. Some patients stay at home and under the care of loved ones. The difficulties of moving a patient from a bedroom to a bathroom are significantly exacerbated. Every time, especially at night without a nurse present, the patient needs to be cleaned and bathed, the loved ones at home would have a lot of problems taking care of that patient.

U.S. Pat. No. 5,539,941 of Fuller discloses a support frame positioned over a hospital bed to assist in lifting and turning a patient on a sheet. In addition to the lift mechanism, the frame has a carriage mechanism which can carry a lifted patient beyond the side or the end of the bed. The patient can also be lifted from the bed, and the patient is transported to other locations in the hospital without severe physical handling. A cart is used to bath a patient. A drain pan is placed under the patient to catch bath water and return the water to a drain water tank on the cart.

Fuller's support frame has complex design and is usually expensive. Moreover, such support frame still requires transporting patients by means of a wheel chair or a hospital cart which does not have the capability to lift and place that patient into a bathtub. Nurses still need to physically lift that patient and carry him or her over into a bathtub.

Furthermore, other transport devices such as those described in U.S. Pat. No. 5,379,486 to Cassidy cannot provides nurses lifting of patients out of a wheelchair or a hospital cart and putting those patients right into the bed or bathtub without using physical handling.

Therefore what is needed is a cost-effective patient transport apparatus to and from a patient bed to a bathtub that assists nurses in lifting and carrying patients to and from a hospital bed to a bathtub. Furthermore, what is needed is a patient transport apparatus that can reach under hospital beds in order to reach to patients and lift them out of bed without physical handling from nurses. Yet, what is needed is a patient transport apparatus that can place patients right into a bathtub without physical lifting from nurses. Finally, what is needed is a patient transport apparatus that is compact and conveniently stored away without occupying a large space either in a hospital or at home.

SUMMARY OF THE INVENTION

Accordingly, an objective of the present invention is to provide a patient transport apparatus is disclosed that includes: a base with caster wheels, a double scissor truss, mounted on the base, retracted and extended vertically by the operation of a base crank handle, and a hoisting assembly positioned atop of a support frame member. The hoisting member further includes winch handles connected to a set of pulleys which are connected to cables and a fabric sling for supporting a patient. The hoisting assembly is configured to move along the support frame member by means of wheels installed on the bottom side of the frame member so that the fabric sling can reach out to the patient. A telescoping support pole, connected to the front of the support frame member, designed to freely rotated and to lean against either the bed or the bathtub in order to provide balance to the apparatus.

Another objective of the present invention is to provide a cost-effective patient transport apparatus that frees nurses from lifting and carrying patients to and from a hospital bed to a bathtub.

Yet another objective of the present invention is to provide a patient transport apparatus that can go under hospital beds in order to reach to patients and lift them out of bed without the need of physical handling from nurses.

Yet, another objective of the present invention is to provide a patient transport apparatus that can place patients right into a bathtub without the need of physical lifting from nurses.

Yet another objective of the present invention is to provide a patient transport apparatus that is compact and conveniently stored away without occupying a large space either at home or in a hospital.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
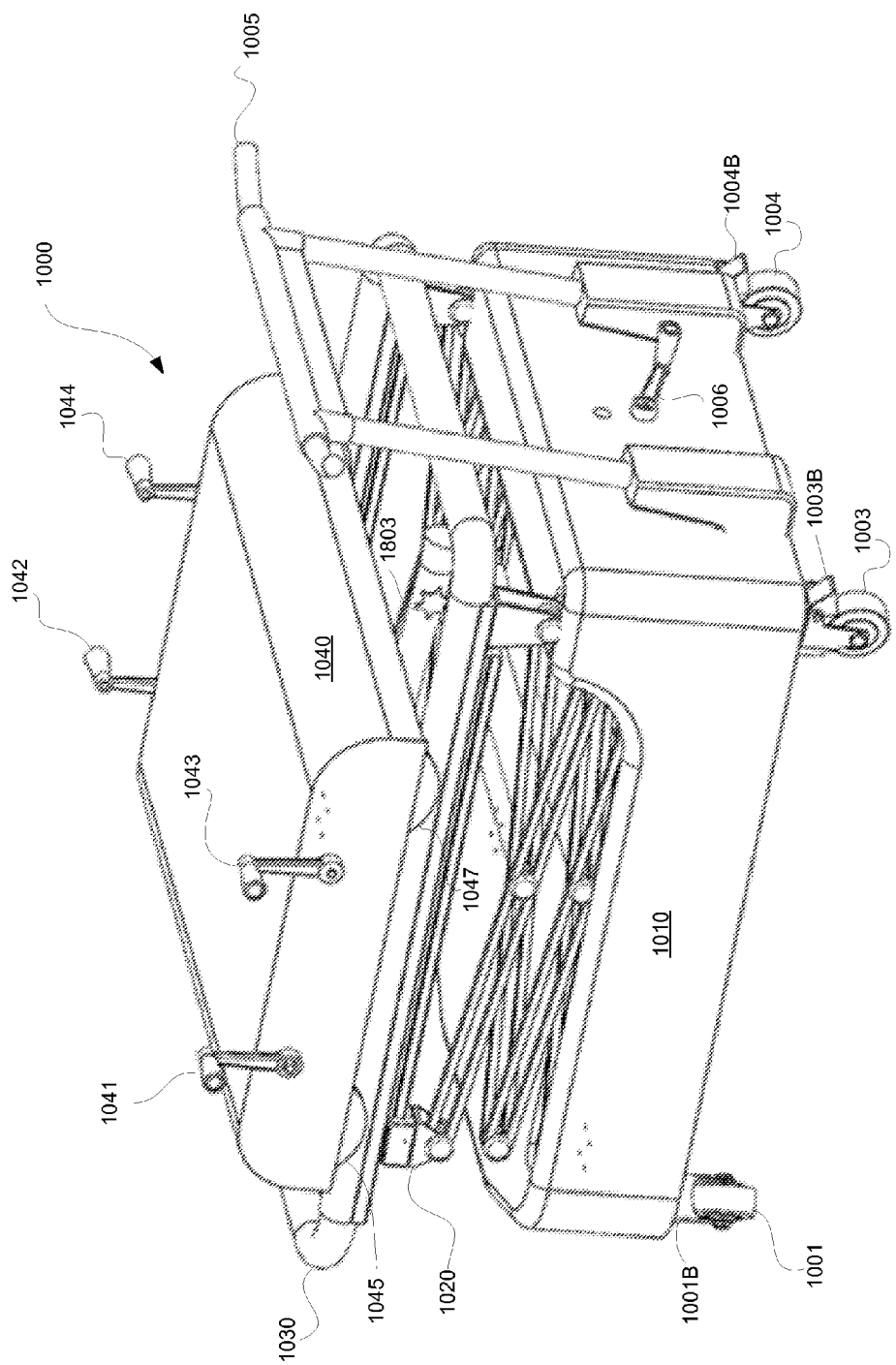
FIG. 1 is a diagram illustrating a perspective view of a patient transport apparatus for transport between a patient bed and a bathtub (hereinafter abbreviated as "patient transport apparatus") in an initial unused or folded state in accordance to an embodiment of the present invention.

Referring now to the drawings and specifically to FIG. 1, a patient transport apparatus for transport between a patient bed and a bathtub is generally indicated by reference number 1000 (hereinafter referred to as "patient transport apparatus 1000"). Patient transport apparatus 1000 as shown in FIG. 1 is in an initial unused or folded state so that it can be conveniently stored under a patient bed or in a storage room. In this folded state, patient transport apparatus 1000 has a dimension of 560 mm in height, 1100 mm in length, and 800 mm in width.

Continuing with FIG. 1, the patient transport apparatus 1000 includes a base 1010 having a first caster wheel 1001, a second caster wheel 1002 (not shown in FIG. 2 because it is on the right hand side of base 1010), a third caster wheel 1003, and a fourth caster wheel 1004. First, second, third and fourth caster wheels 1001-1004 are located at four corners of a bottom side of the base 1010. In the back side of patient transport apparatus 1000, a handle 1005 is mechanically connected to the back of base 1010. In one embodiment, handle 1005 can be extendable or retractable. When handle 1005 is fully extended, a nurse uses handle 1005 for steering patient transport apparatus 1000 around. When handle 1005 is completely retracted, patient transport apparatus 1000 is conveniently stored under the patient bed or in a closet (not shown in FIG. 1). In one embodiment, each caster wheel 1001-1004 is a caster swivel wheel and has its own respective brake mechanism 1001B-1004B. In one embodiment, each brake mechanism 1001B-1004B is a face contact brake. In one embodiment, each brake mechanism 1001B-1004B is a total lock brake or a side action brake.

Still referring to FIG. 1, patient transport apparatus 1000 includes a double scissor truss 1020 connected to the top side of base 1010. Double scissor truss 1020 is operable to extend and retract vertically from base 1010. In one embodiment, double scissor truss 1020 further comprises a series of bars joined together to form an X shape at a joint at the pivot of each of the bars by a round pin extending through an opening in each of the two bars. The X shapes are repeatedly joined with the other X shapes at their tops and bottoms to form double scissor truss 1020.

Next, continuing with FIG. 1, a base crank handle 1006 is positioned in the back of base 1010 and mechanically connected to double scissor truss 1020 so that when base crank handle 1006 is rotated in the first direction, it causes double scissor truss 1020 to extend vertically and when base crank handle 1006 is rotated in the second direction opposite to the first direction, it causes double scissor truss 1020 to retract to the initial unused (or folded) position as shown in FIG. 1. In one embodiment, the first direction is the clockwise direction and the second direction is the counter-clockwise direction.

Continuing with the description of FIG. 1, a support frame member 1030 is mechanically connected to the top side of double scissor truss 1020. In one embodiment of the present invention, support frame member 1030 is designed to be extended horizontally so as to reach to the location of the patient in the patient bed or to reach to the middle of the bathtub to lower the patient therein. In the initial unused state, support frame member 1030 is retracted so that patient transport apparatus 1000 can be stored away. In one embodiment, support frame member 1030 also includes a locking mechanism 1033 designed to lock support frame 1030 at a fixed length. In one embodiment, support frame member 1030 further includes a first rail 1031 and a second rail 1032 (not shown in FIG. 1) fixedly connected on the bottom and along the longitudinal direction of frame support member 1030. First rail 1031 and second rail 1032 are designed to provide connections with double scissor truss 1020 and as a means for double scissor truss 1020 to slide outward to retract and to slide inward toward base 1010 to extend. Furthermore, first rail 1031 and the second rail 1032 are also configured for an anti-tilt wheel (not shown in FIG. 1) to operate. The anti-tilt wheel is described later in FIG. 7 and FIG. 8.

Continuing with FIG. 1, as described above, handle 1005 is connected to the back of base 1010 so that the nurse can steer patient transport apparatus 1000 with ease. In one embodiment, handle 1005 is retractable in the initial unused state so that patient transport apparatus 1000 can be stored away. In operation, handle 1005 can be extended and locked up at any height.

Still referring to FIG. 1, a hoisting assembly 1040 is movably connected on a top side of support frame member 1030. A first winch handle 1041, a second winch handle 1042, a third winch handle 1043, and a fourth winch handle 1044 are connected to the two sides of hoisting assembly 1040 respectively. The complete description of the remainder components of patient transport apparatus 1000 is described in FIG. 2 when it is in an operational or used state.

Figure 2:
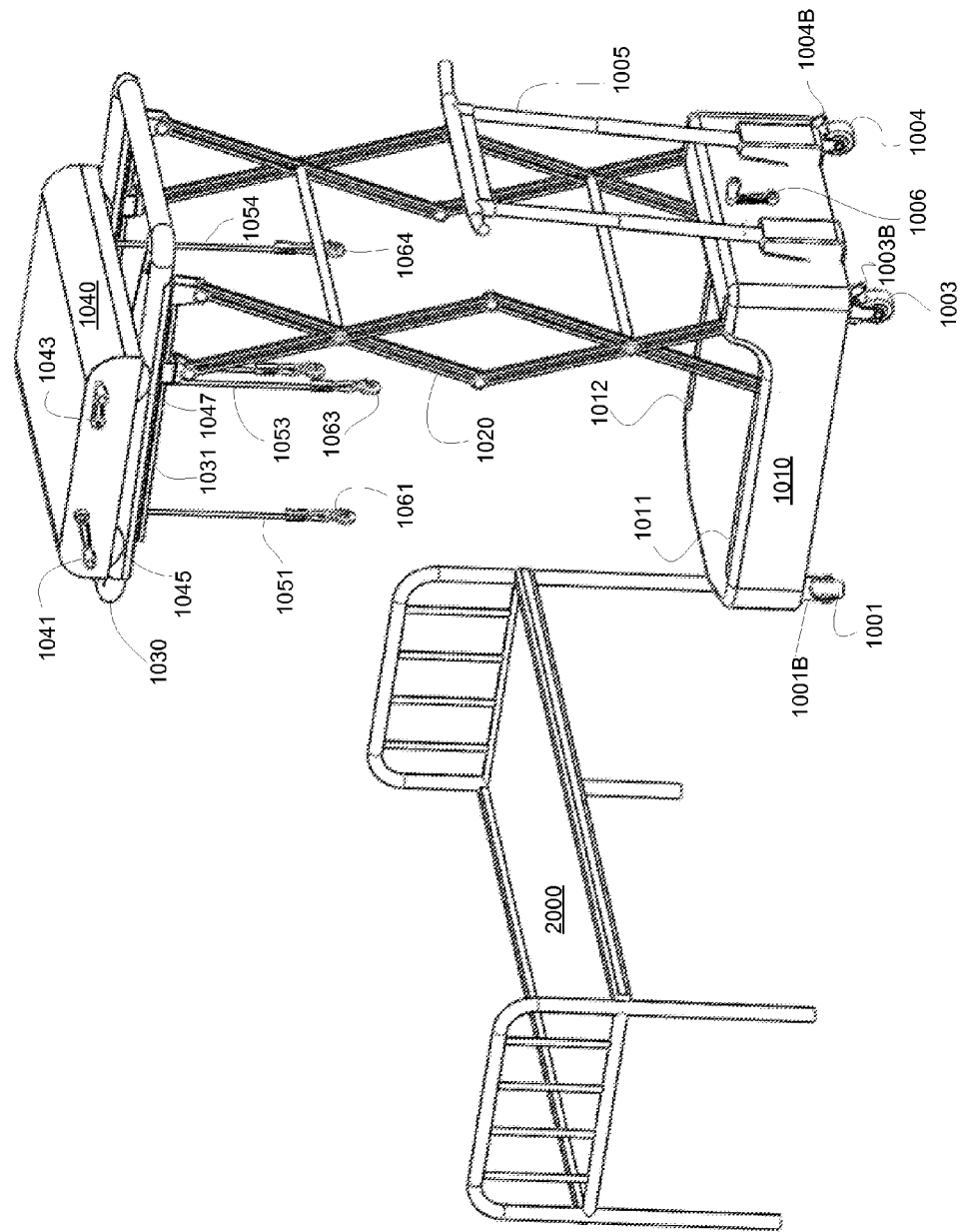
FIG. 2 is a diagram illustrating a perspective view of the patient transport apparatus of FIG. 1 in fully extended or used state in a manner so that the base can go underneath the patient bed in order to reach the patient in accordance with an embodiment of the present invention.

Now referring specifically to FIG. 2, when patient transport apparatus 1000 is fully extended in a used state as it is approaching a patient bed 2000, a first cable 1051, a second cable 1052, a third cable 1053, and a fourth cable 1054 are connected to first winch handle 1041, second winch handle 1042, third winch handle 1043, and a fourth winch handle 1044 respectively. A first hook 1061 is connected to first cable 1051, a second hook 1062 to second cable 1052, a third hook 1063 to third cable 1053, and a fourth hook 1064 to fourth cable 1054 respectively.

Figure 3:
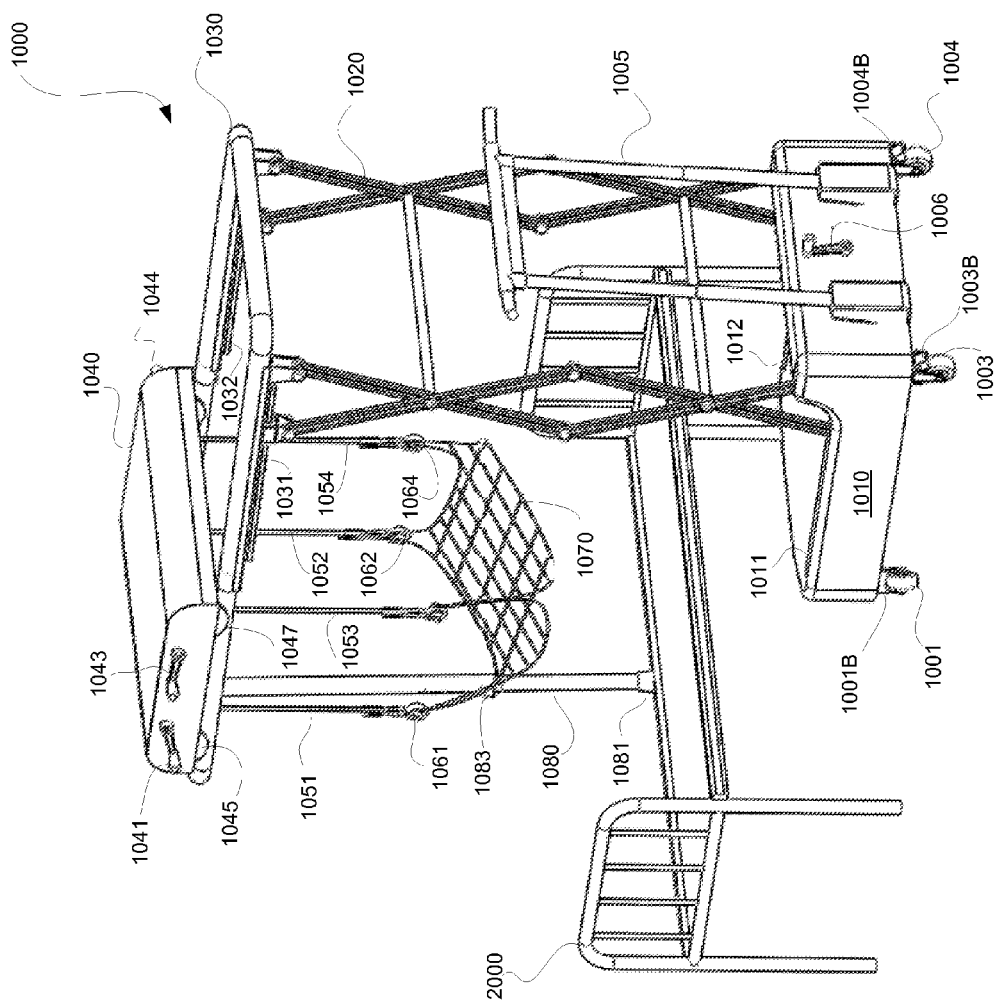
FIG. 3 is a diagram illustrating a perspective view of the patient transport apparatus of FIG. 1 with a fabric sling in a fully extended state and the hoisting assembly is also extended in order to get closer to the patient in accordance with an embodiment of the present invention.

Referring next to FIG. 3, when patient transport apparatus 1000 is fully extended and reached patient bed 2000. In one embodiment of the present invention, patient transport apparatus 1000 is configured such that base 1010 goes underneath patient bed 2000 when double scissor truss 2010 is fully extended to its highest height. At the same time, support frame member 1030 is extended out to reach in to the location of the patient. At patient bed 2000, a telescoping support pole 1080 is unfolded from support frame member 1030 to provide support to patient transport apparatus 1000. First caster wheel 1001, second caster wheel 1002, third caster wheel 1003, and fourth caster wheel 1004 are locked by their respective locking mechanisms 1001B-1004B to prevent patient transport apparatus 1000 from unwanted movements when patient transport apparatus 1000 is in the stationary mode. In one embodiment, telescoping support pole 1080 further comprises a plastic tip 1081 at the distal end from support frame member 1030, a rotation lock mechanism 1082 configured to lock telescoping support pole 1080 at every 40 degree interval, and a linear lock mechanism 1083 to lock telescoping support pole 1080 at a fixed length. In one embodiment, telescoping support pole 1080 has a length of 1850 mm when fully extended and a length of 1100 mm when fully retracted.

Continuing with FIG. 3, a fabric sling 1070 is removably connected to hooks 1061-1064. The nurse uses first to fourth winch handles 1041-1044 to lower fabric sling 1070 to put a patient therein. In the preferred embodiment, first to fourth winch handles 1041-1044 are configured so that second cable 1052 and fourth cable 1054 are released and withdrawn together, first cable 1051 and third cable 1053 are released and withdrawn together. The detailed operation of first to fourth winch handles 1041-1044 is described later in FIG. 8. Afterward, the nurse uses first to fourth winch handles 1041-1044 again to lift up the patient. Then, telescoping support pole 1080 is removed from patient bed 2000, caster wheels 1001-1004 are unlocked from locking mechanisms 1001B-1004B, and the patient (not shown) is transported to a bathtub.

Figure 4:
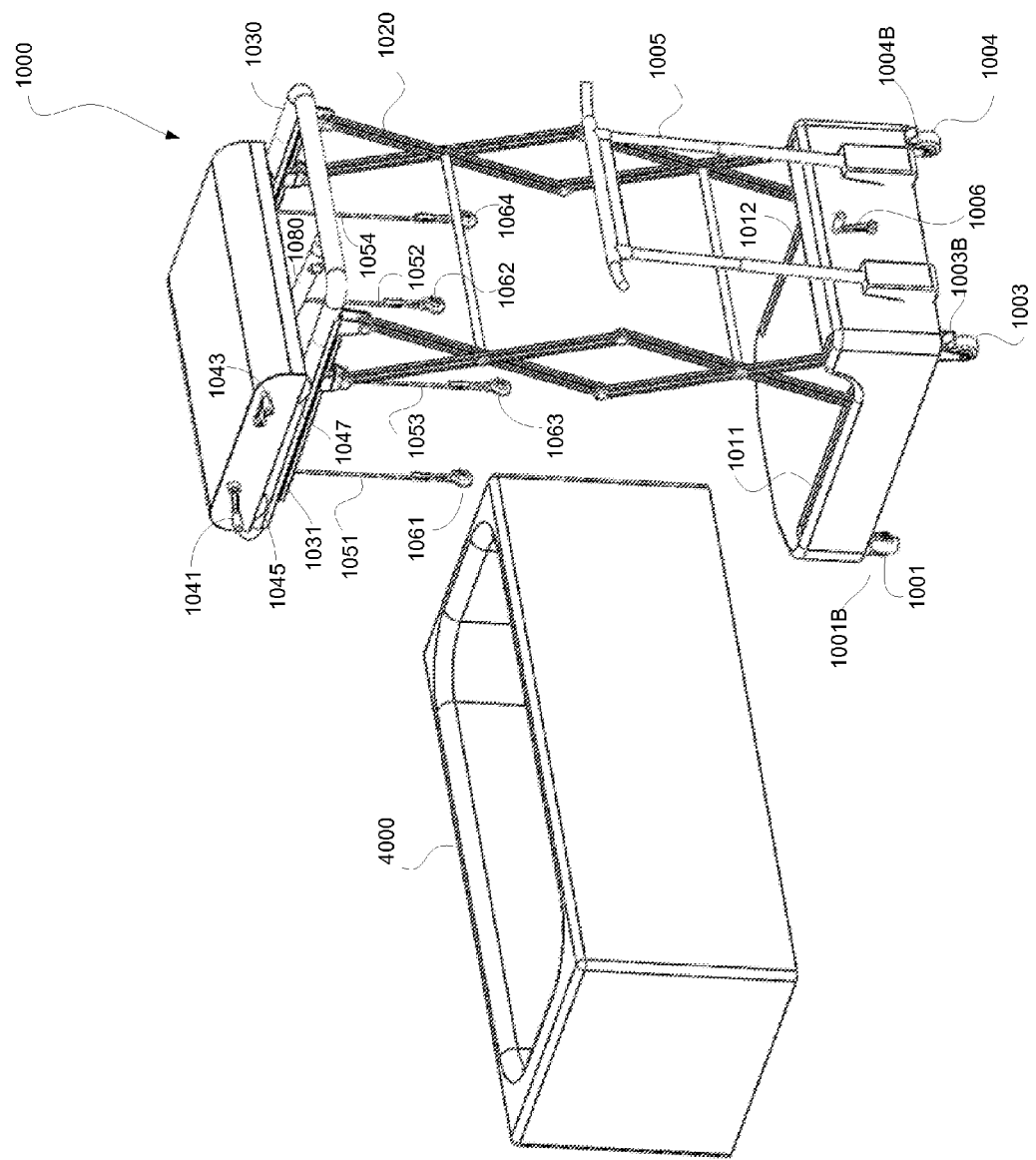
FIG. 4 is a diagram illustrating a perspective view of the patient transport apparatus of FIG. 1 with a fabric sling in a fully erected state and the hoisting assembly is withdrawn when carrying the patient to a bathtub in accordance with an embodiment of the present invention.

Now referring next to FIG. 4, when patient transport apparatus 1000 approaches a bathtub 4000. FIG. 4 illustrates patient transport apparatus 1000 as shown in previous FIG. 3 without fabric sling 1070 and support member 1030 is retracted toward the back of base 1010 where handle 1005 is located.

Figure 5:
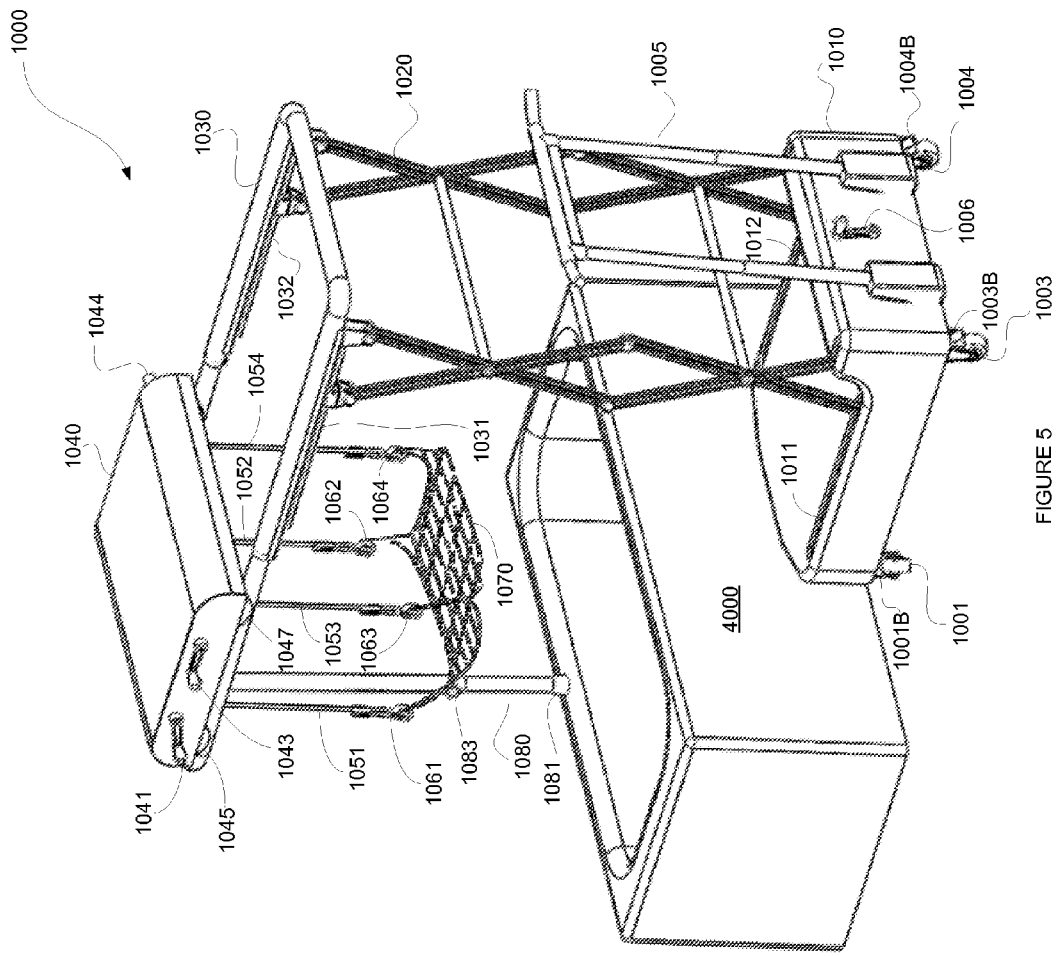
FIG. 5. is a diagram illustrating the patient transport apparatus of FIG. 1 with a fabric sling in a fully erected state and the hoisting assembly is fully extended in order to lower the patient into the bathtub in accordance with an embodiment of the present invention.

Referring next to FIG. 5 when the patient transport apparatus 1000 is at the bathtub 4000. Support frame member 1030 is again extended out carrying the patient on fabric sling 1070 toward the center of bathtub 4000. In addition, telescoping support pole 1080 is unfolded and extended to lean against the far side of bathtub 4000 to provide counter weight support when patient transport apparatus 1000 is in the process of lowering the patient to bathtub 4000. In FIG. 4 and FIG. 5, when double scissor truss 1020 is fully extended, it shows that patient transport apparatus 1000 also includes a first aperture 1011 and a second aperture 1012 located on the left hand side and the right hand side of the top surface of base 1010 respectively. First aperture 1011 and second aperture 1012 store double scissor truss 1020 in a flush position with the top surface of base 1010 when double scissor truss 1020 is retracted into the initial unused position. With this design, patient transport apparatus 1000 can be folded and conveniently stored away. The structure of base 1010 which illustrates the manner double scissor truss 1020 operates is shown in the next figures.

Figure 6A:
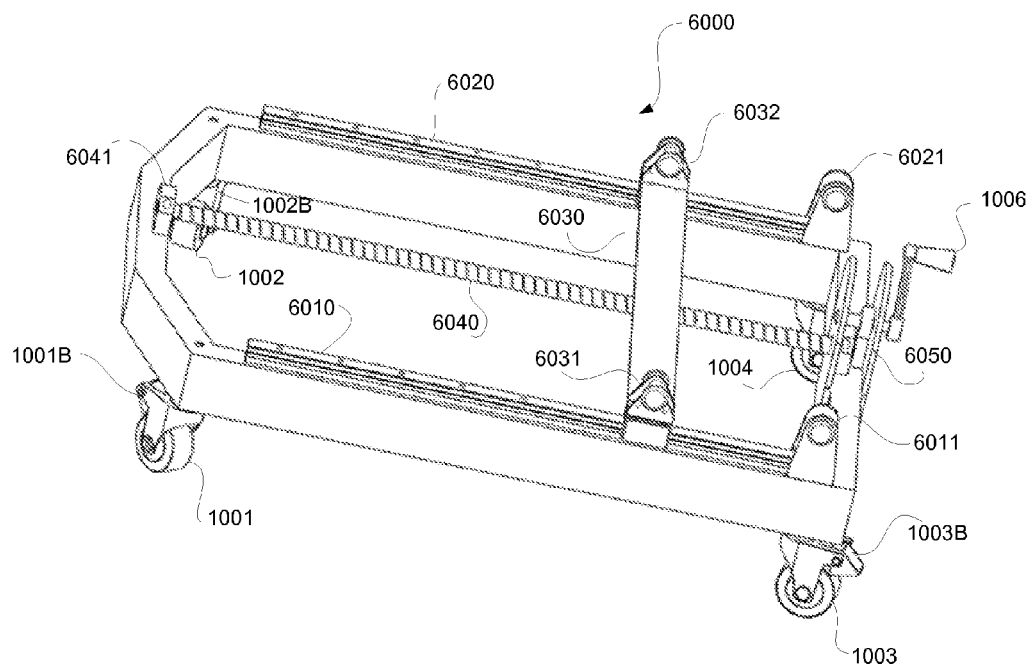
FIG. 6A is diagram illustrating a top view of the structure of the base of the patient transport apparatus in accordance with an embodiment of the present invention.

Now referring to FIG. 6A, the structure of base 1010 is illustrated. In one embodiment of the present invention, base 1010 includes a frame member 6000, a first H-shaped bar 6010 is connected to the left hand side surface of frame member 6000, a second H-shaped connector 6020 is connected to the right hand side surface of frame member 6000. First H-shaped bar 6010 and second H-shaped bar 6020 are connected on their sides so that they constitute a pair of gliders. A horizontal bar 6030 having a first upside down C-shaped connector 6031 and a second upside down C-shaped connector 6032 connected at the two ends of horizontal bar 6030. The first upside down C-shaped connector 6031 is mated snuggly with first H-shaped bar 6010 and second upside down C-shaped connector 6032 is mated snuggly with second H-shaped bar 6020 so that horizontal bar 6030 can move back and forth on top of the surface of frame member 6000. At the end of first H-shaped bar 6010 toward the back of frame member 6000 is a first connector 6011. At the end of second H-shaped bar 6020 toward the back of frame member 6000 is a second connector 6021. First connector 6011 and second connector 6021 are bolted fixedly to frame member 6000. Double scissor truss 1020 is connected to first inverted C-shaped connector 6031, second inverted C-shaped connector 6032, first connector 6011, and second connector 6021.

Continuing with FIG. 6A, a knurl 6040 is connected to the front of frame member 6000 and to a series of gears 6050 and base crank handle 1006 at the back of the frame member 6000 so that knurl 6040 is perpendicular to horizontal bar 6030.

Figure 6B:
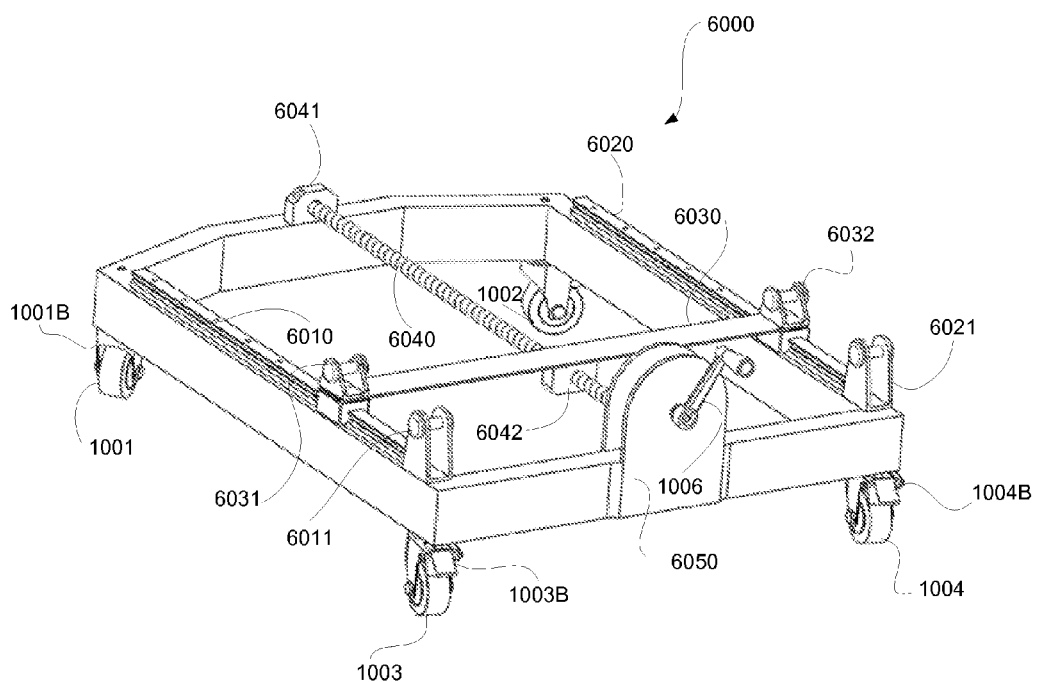
FIG. 6B is diagram illustrating a rear view of the structure of the base of the patient transport apparatus in accordance with an embodiment of the present invention.

Now referring to FIG. 6B illustrating another perspective view of frame member 6000. With this perspective view, frame member 6000 shows a third connector 6042 fixedly connected to the lower surface of horizontal bar 6030. Knurl 6040 goes through second connector 6042 and ends at front connector 6041.

In operation, when a nurse rotates base crank handle 1006 in a first direction, series of gears 6050 causes knurl 6040 to rotate, pushing horizontal bar 6030 to glide forward along first inverted C-shaped connector 6031 and second inverted C-shaped connector 6032. This causes double scissor truss 1020 to retract into first aperture 1011 and second aperture 1012. On the other hand, when the nurse rotates base crank handle 1006 in a second direction opposite to the first direction, series of gears 6050 causes knurl 6040 to rotate pushing horizontal bar 6030 to glide backward along first inverted C-shaped connector 6031 and second inverted C-shaped connector 6032. This causes double scissor truss 1020 to extend vertically. In one embodiment, double scissor truss 1020 is extended vertically, leaving free space in front of base 1010 so that base 1010 has the capability to go underneath patient bed 2000 as shown in FIG. 3. In one embodiment, series of gears 6050 is connected in chain so that the transmission ratio of base crank handle 1006 is 2:1. In one embodiment, knurl 6040 is rotated at 2 mm per round.

Figure 7:
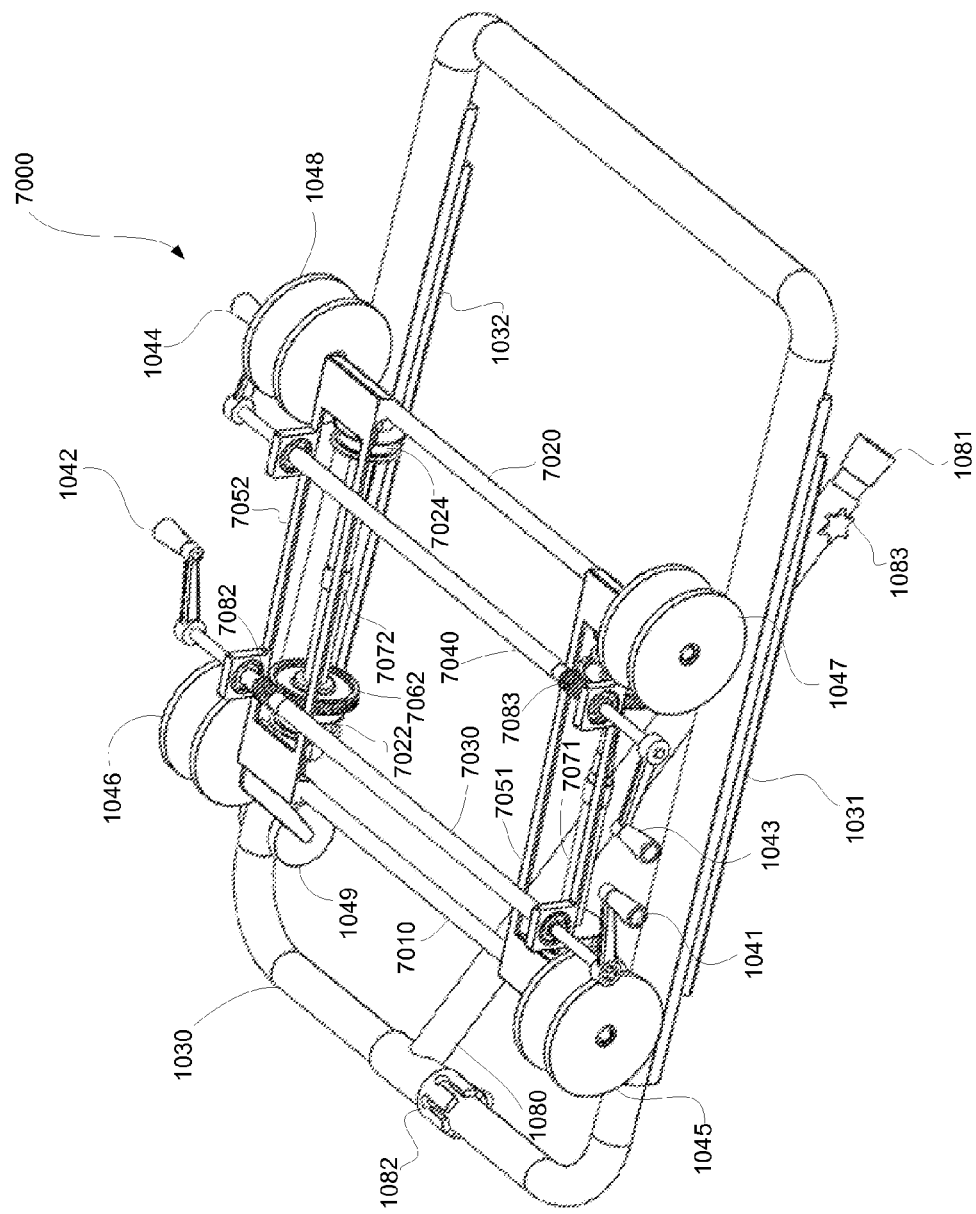
FIG. 7 is a diagram illustrating the internal structure of the hoisting assembly in accordance with an embodiment of the present invention.
Figure 8:
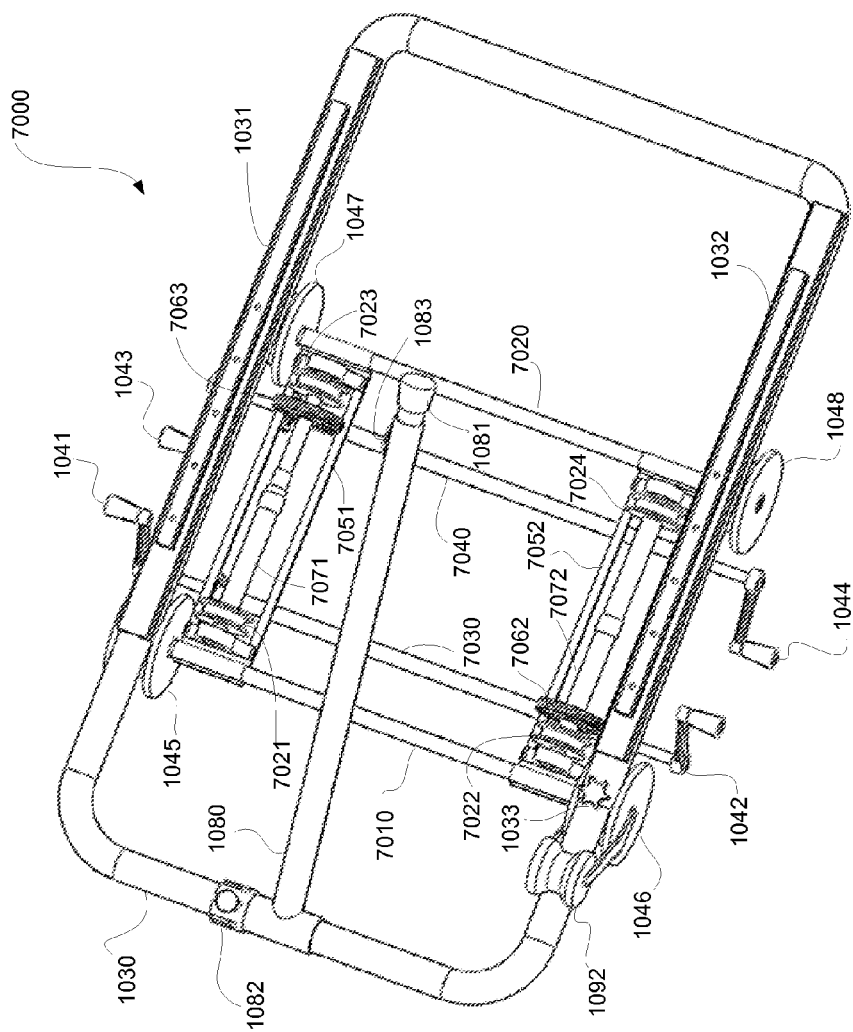
FIG. 8 is a diagram illustrating the bottom view of the internal structure of the hoisting assembly of the patient transport apparatus in accordance with an embodiment of the present invention.

Finally, referring now to FIG. 7 and FIG. 8, two different perspective views of the internal structure of hoisting assembly 1040 are illustrated. Hoisting assembly 1040 includes a rectangular frame member 7000 positioned to move in a longitudinal direction of support frame 1030, and a system of pulleys comprising a first pulley 7021, a second pulley 7022, a third pulley 7023, and a fourth pulley 7024. In one embodiment of the present invention, rectangular frame member 7000 is configured to carry system of pulleys 7021-7034 along the longitudinal direction of support frame member 1030.

Continuing now with FIG. 7, rectangular frame member 7000 comprises a first axial member 7010 and a second axial member 7020 arranged in the traverse direction, a first longitudinal rectangular plate 7051 and a second longitudinal rectangular plate 7052 fixedly connected on top of first axial member 7010 and second axial member 7020 forming rectangular frame 7000 as illustrated in FIG. 7. Located above first longitudinal rectangular plate 7051 and second longitudinal rectangular plate 7052 are a first crank shaft 7030 and a second crank shaft 7040 arranged in the traverse direction and parallel to both first axial member 7010 and a second axial member 7020.

As illustrated in FIG. 7, first wheel 1045, second wheel 1046, third wheel 1047, and fourth wheel 1048 are movable on top of support frame member 1030. In one embodiment, second wheel 1046 is also connected to an anti-tilt wheel 1049 located underneath support frame member 1030. Anti-tilt wheel 1049 is designed to fit snuggly with support frame member 1030 from underneath so that hoisting assembly 1040 is prevented from falling out of support frame member 1030.

Continuing with the description of FIG. 7, first wheel 1045 is connected to second wheel 1046 via first axial member 7010 such that both first wheel 1045 and second wheel 1046 rotate freely around first axial member 7010. Similarly, third wheel 1047 is connected to fourth wheel 1048 via second axial 7020 such that both third wheel 1047 and fourth wheel 1048 rotate freely around second axial member 7020.

Still referring to FIG. 7, first winch handle 1041 is connected to second winch handle 1046 via first crank shaft 7030 so that first winch handle 1041 and second winch handle 1046 are rotated together. Second winch handle 1046 is connected to second pulley 7022 via a first driven gear 7062. Similarly, third winch handle 1043 is connected to fourth winch handle 1044 via second crank shaft 7040 so that third winch handle 1043 and fourth winch handle 1044 are rotated together. Third winch handle 1043 is connected to third pulley 7023 via a second driven gear 7063.

Finally, continuing with FIG. 7 and FIG. 8, first pulley 7021 is fixedly connected to third pulley 7023 by a first shaft 7071 so that first pulley 7021 and third pulley 7023 are forced to rotate together. Second pulley 7022 is fixedly connected to fourth pulley 7024 via a second shaft 7072 so that second pulley 7022 and fourth pulley 7024 are forced to rotate together. In one embodiment, in first crank shaft 7030, only second winch handle 1046 includes a driving gear 7082 connected perpendicularly and in chain with first driven gear 7062. Similarly, in second crank shaft 7040, only third winch handle 1043 includes a second driving gear 7083 connected perpendicularly and in chain with second driven gear 7063 (please refer to FIG. 8). In this embodiment, each of first to fourth pulley 7022-7024 has a transmission ratio of 1:80.

Continuing with FIG. 7 and FIG. 8, in operation, a nurse can operate hoisting assembly 1040 from either side of hoisting assembly 1040. To release cables 1051-1054, the nurse can operate winch handles 1041-1044 from either side. When the nurse rotates first winch handle 1041 or second winch handle 1042, first crank shaft 7030 forces second winch handle 1042 and first driving gear 7082 to rotate, causing first driven gear 7062 and second pulley 7022 to rotate. Second shaft 7072 causes fourth pulley 7024 to rotate. Thus, second cable 1052 and fourth cable 7054 are lowered or raised together as discussed above.

Continuing with the operation of hoisting assembly 1040 as illustrated in FIG. 7 and FIG. 8, when the nurse rotates third winch handle 1043 or fourth winch handle 1044, second crank shaft 7040 forces the other winch handle, i.e., fourth winch handle 1044 and second driving gear 7083 to also rotate, causing second driven gear 7063 and third pulley 7023 to rotate. First shaft 7071 causes first pulley 7021 to rotate. Thus, first cable 1051 and third cable 7053 are lowered or raised together.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A patient transport apparatus for transport between a patient bed and a bathtub, comprising:
   a base having a first caster wheel, a second caster wheel, a third caster wheel, and a fourth caster wheel arranged at four corners of a bottom side of said base respectively;
   a extendable and retractable handle mechanically connected to a backside of said base for maneuvering said patient transport apparatus;
   a double scissors truss, mechanically connected on a top side of said base, operable to extend and retract vertically from said base;
   a crank handle, mechanically connected to said double scissor truss, wherein when said crank handle is rotated in one direction, said double scissor truss extends vertically and when said crank handle is rotated in the opposite direction, said scissor truss retracts to an initial unused position;
   a support frame member, mechanically connected to the top portion of said double scissor truss, configured to extend and retract horizontally so as to reach to said patient bed or to said bathtub;
   a hoisting assembly, positioned on top of said support frame member, configured to move back and forth along longitudinal sides of said support frame member; and
   a telescoping support pole, rotably connected to a front traverse end of said support frame member, operable to rotate in a direction perpendicular to said front traverse end of said support frame member, wherein:
   said hoisting assembly further comprises a rectangular frame member and a system of pulleys, said rectangular frame operative to move said system of pulleys back and forth along the longitudinal sides of said support frame member, wherein:
   said rectangular frame member further comprising a first axial member and a second axial member;
   a first longitudinal rectangular plate and a second longitudinal rectangular plate fixedly connected on top and at both ends of said first axial member and said second axial member so as to form said rectangular frame member,
   a first wheel, a second wheel, a third wheel, and a fourth wheel, arranged at four corners of said rectangular frame member, wherein said first wheel is connected to said second wheel via said first axial member and rotate freely around said first axial member, wherein said third wheel is connected to said fourth wheel via said second axial member and rotate freely around said second axial member, and said system of pulleys further comprising a first pulley member, a second pulley member, a third pulley member, and a fourth pulley member, arranged at the four corners of said rectangular frame, proximate and perpendicular to said first wheel, said second wheel, said third wheel, and said fourth wheel respectively, wherein each of said first pulley member, said second pulley member, said third pulley member, and fourth pulley member are connected to a first winch handle, a second winch handle, a third winch handle, and a fourth winch handle respectively.

2. The patient transport apparatus for transport between a patient bed and a bathtub of claim 1, further comprising:

a first hook connected to a first cable which is connected to said first pulley, a second hook connected to a second cable which is connected to said second pulley, a third hook connected to a third cable which is connected to said third pulley, and a fourth hook connected to a fourth cable which is connected to said fourth pulley; and a fabric sling, removably connected to said first cable, said second cable, said third cable, and said fourth cable at four corners of said fabric sling by means of said first hook, said second hook, said third hook, and said fourth hook respectively, adapted to support a patient during moving and lifting of said patient.

3. The patient transport apparatus for transport between a patient bed and a bathtub of claim 2 wherein said first pulley and said second pulley are mechanically connected to a first crank shaft which is further connected to said first winch handle and to said second winch handle at each end of said first crank shaft, wherein said first crank shaft is positioned above said first longitudinal rectangular plate and said second longitudinal rectangular plate and parallel to both said first axial member and said second axial member.

4. The patient transport apparatus for transport between a patient bed and a bathtub of claim 3 wherein said third pulley and said fourth pulley are mechanically connected to a second crank shaft which is further connected to said third winch handle and said fourth winch handle at each end of said second crank shaft, wherein said second crank shaft is positioned above said first longitudinal rectangular plate and said second longitudinal rectangular plate and parallel to both said first axial member and said second axial member.

5. The patient transport apparatus for transport between a patient bed and a bathtub of claim 1 wherein in said second winch handle is rotatably connected to said second pulley via a first driving gear which is connected to a first driven gear.

6. The patient transport apparatus for transport between a patient bed and a bathtub of claim 5 wherein said third winch handle is rotatably connected to said third pulley via a second driving gear which is connected to a second driven gear.

7. The patient transport apparatus for transport between a patient bed and a bathtub of claim 6 wherein said first driven gear, said second pulley, and said fourth pulley are fixedly connected to a first shaft so that said second pulley and said fourth pulley are rotated together when either said first winch handle or said second winch handle are rotated, and wherein said second driven gear, said first pulley, and said third pulley are fixedly connected to a second shaft so that said first pulley and said third pulley are rotated together when either said third winch handle or said fourth winch handle are operated by a nurse or aide.

8. The patient transport apparatus for transport between a patient bed and a bathtub of claim 7 wherein said first winch handle, said second winch handle, said third winch handle, and said fourth winch handle each has a transmission ratio of 1:80.

9. The patient transport apparatus for transport between a patient bed and a bathtub of claim 1 wherein support frame member further comprises:

a first rail and a second rail fixedly connected to bottom sides in the longitudinal direction of said support frame member so that said double scissor glides outward toward the front of said patient transport apparatus to retract and so that said double scissor truss glides backward toward said handle to extend; and a locking mechanism operable to lock said support frame member at a given length when said support frame member is extended or retracted.

10. The patient transport apparatus for transport between a patient bed and a bathtub of claim 1 wherein each of said first, second, third, and fourth caster wheels is connected to a braking mechanism so as to prevent said patient transport apparatus from unwanted rotations when said patient transport apparatus is maintained in a stationary position.

11. The patient transport apparatus for transport between a patient bed and a bathtub of claim 1 wherein said base further comprises a first aperture and a second aperture positioned on said left hand side and right hand side of said top surface respectively so that said double scissor lift is stored in a flush position with said top surface of said base so that in said unused state said bed to bath patient transport apparatus is folded into a box.

12. The patient transport apparatus for transport between a patient bed and a bathtub of claim 11 wherein said patient transport apparatus when fully extended has height of 1840 mm and a width of 800 mm.

13. The patient transport apparatus for transport between a patient bed and a bathtub of claim 12 wherein said support frame member when fully extended has a length of 1750 mm and a length of 1100 mm when fully retracted.

14. The patient transport apparatus for transport between a patient bed and a bathtub of claim 13 wherein said telescoping support pole is configured to rotate forward and backward from 0 degree to 180 degrees and wherein said telescoping support pole further comprises an angular locking mechanism that locks at every 40 degree angle.

15. The patient transport apparatus for transport between a patient bed and a bathtub of claim 13 wherein the distal end of said telescoping support pole away from said second frame is covered by a plastic tip.

16. The patient transport apparatus for transport between a patient bed and a bathtub of claim 13 wherein said telescoping support pole has a length of 1850 mm when fully extended and a length of 1100 mm when fully retracted.

17. The patient transport apparatus for transport between a patient bed and a bathtub of claim 13 wherein said base crank handle has a transmission ratio of 2:1.

18. The patient transport apparatus for transport between a patient bed and a bathtub of claim 13 wherein said knurl is rotated is rotated at 2 mm per round.

19. The patient transport apparatus for transport between a patient bed and a bathtub of claim 1 wherein said telescoping support pole has a plurality of sections and a locking mechanism configured to lock said telescoping support pole to different lengths.

20. The patient transport apparatus for transport between a patient bed and a bathtub of claim 1 wherein said double scissor truss is connected to a pair of connectors of a first lateral H-shaped bar and a second lateral H-shaped bar fixedly screwed to a first lateral side and a second lateral side of said base respectively, the remainder ends of said double scissor truss are connected to a second pair of connectors of a horizontal bar movable along said first lateral H-shaped bar and said second lateral H-shaped bar, the middle of said horizontal bar connected to an elongated knurl which in turn connected to said base crank handle via a series of gears, and wherein when said base crank handle is rotated in said first direction said elongated knurl causes said horizontal bar to glide forward causing said double scissor truss to retract to said initial unused position, and when said base crank handle is rotated in said second direction, said elongated knurl causes said elongated bar to glide backward toward the back end of said base, causing said double scissor truss to extend vertically to an used position, wherein said first direction is clockwise and said second direction is counter-clockwise.

* * * * *